United States Patent
Haworth et al.

[11] Patent Number: 5,376,334
[45] Date of Patent: Dec. 27, 1994

[54] MASS TRANSFER DEVICE HAVING A HOLLOW FIBER BUNDLE

[75] Inventors: William S. Haworth, White Bear Lake; Robert W. Olsen, Plymouth; Mark S. Goodin, Medina, all of Minn.

[73] Assignee: Avecor Cardiovascular Inc., Plymouth, Minn.

[21] Appl. No.: 63,997

[22] Filed: May 19, 1993

[51] Int. Cl.5 .................. A61M 1/34; B01D 63/10
[52] U.S. Cl. .................. 422/46; 422/48; 210/321.87
[58] Field of Search .............. 422/46, 48; 210/321.5, 210/321.87

[56] References Cited

U.S. PATENT DOCUMENTS

| | | | |
|---|---|---|---|
| 1,248,898 | 12/1917 | Parks | 242/26 |
| 1,357,434 | 11/1920 | Anderson | 242/26 |
| 1,482,909 | 2/1924 | Calkins | 242/26 |
| 2,259,364 | 10/1941 | Bartholomew | 242/26 |
| 2,539,942 | 1/1951 | Beeftink | 242/159 |
| 2,605,053 | 6/1952 | Broden | 242/26 |
| 3,339,341 | 9/1967 | Maxwell et al. | 55/16 |
| 3,422,008 | 1/1969 | McLain | 210/22 |
| 3,794,468 | 2/1974 | Leonard | 422/46 |
| 4,315,819 | 2/1982 | King et al. | 210/321.3 |
| 4,371,122 | 2/1983 | Schuller | 242/43 R |
| 4,394,986 | 7/1983 | Hasegawa et al. | 242/18 R |
| 4,430,219 | 2/1984 | Kuzumoto et al. | 210/321.3 |
| 4,572,446 | 2/1986 | Leonard et al. | 422/46 |
| 4,770,852 | 9/1988 | Takahara et al. | 422/48 |
| 4,952,312 | 8/1990 | Zantonelli et al. | 210/321.74 |
| 4,971,836 | 11/1990 | Fukasawa et al. | 427/235 |
| 4,975,247 | 12/1990 | Badoluto et al. | 422/48 |
| 5,033,686 | 7/1991 | Rebsamen | 242/35.5 R |
| 5,043,140 | 8/1991 | Combs | 422/46 |
| 5,139,741 | 8/1992 | Hagiwara | 422/48 |
| 5,188,801 | 2/1993 | Fini | 422/48 |

FOREIGN PATENT DOCUMENTS 819861  9/1959  United Kingdom .

Primary Examiner—James C. Housel
Assistant Examiner—N. Bhat
Attorney, Agent, or Firm—Thomas E. Popovich; David B. Edgeworth

[57] ABSTRACT

A mass transfer device including a hollow fiber bundle wound on a core for radially outward flow of a first fluid. The core has an axis extending from one end to the other. The hollow fiber bundle has packing fractions which increase radially outward of the core's axis for a major portion of the bundle. Methods for making such mass transfer device.

15 Claims, 4 Drawing Sheets

MASS TRANSFER DEVICE HAVING A HOLLOW FIBER BUNDLE

FIELD OF THE INVENTION

The present invention relates to a mass transfer device in which substances contained in fluids flowing on opposite sides of microporous hollow fiber membranes are exchanged for each other by molecular transfer across the membranes. More particularly, the invention relates to a hollow fiber blood oxygenator for extracorporeally oxygenating the blood of an animal or human.

BACKGROUND OF THE INVENTION

Many types of hollow-fiber blood oxygenators have been or are presently available. These are illustrated by:
1. longitudinal (axial) flow through an annular bundle-see U.S. Pat. No. 4,975,247;
2. circumferential flow around an annular bundle-see U.S. Pat. No. 3,794,468;
3. transverse flow across a bundle of substantially rectangular cross section-see U.S. Pat. No. 5,188,801; and
4. radially outward flow through an annular bundle-see U.S. Pat. No. 3,422,008.

Methods for manufacturing the annular shaped hollow fiber bundles are also available. U.S. Pat. Nos. 3,422,008 and 4,975,247 show a method for spiral winding of ribbons of fibers in a criss-cross pattern. The latter patent shows the formation of regional mats and interleaving of the ribbons at the boundary of such regional mats. The above patents disclose the mounting of a core on a rotating mounting member, where the fiber guide traverses reciprocally along a line parallel to the rotational (longitudinal) axis of the mounting member. The above patents further disclose winding fiber onto the core at constant revolutions per minute (RPM) of the mounting member and constant traverse speed of the guide. As the bundle increases in size, i.e. as the circumference of the bundle upon which the fiber is wound increases, the packing fraction of the fiber decreases. In other words, as the bundle extends radially outward relative to the axis of the core, the packing fraction decreases.

For the purposes of this application, packing fraction is defined to mean the fraction of a unit volume of bundle space occupied by hollow fiber. The packing fraction may be determined in ways known in the art including the convenient method of measuring the interstitial space between fiber by weight gain when a unit volume of bundle is primed with a known liquid. Packing fraction at a particular region or zone located radially outward may be determined by stopping the winding process at the radially inner radial boundary of the region or zone and determining the packing fraction at that stage and then continuing the winding process to the outer radial boundary of the region or zone and determining the packing fraction at that stage. Computations known in the art will determine the packing fraction of the region or zone using the prior two values.

It is an object of this invention to construct a radial flow-annular bundle blood oxygenator where the packing fraction approaches or exceeds the value of about sixty percent for high gas transfer while avoiding high pressure drops for the blood across the bundle and while avoiding clotting of the blood in the bundle. It is a further object of this invention to construct a radial flow-annular bundle blood oxygenator having the above stated objective, combined with the use of a relatively small diameter core in the range of about 0.25 inch to 2.5 inches. Smaller diameter cores have the advantage of lowering the prime volume and decreasing the overall size of the blood oxygenator unit, but have the disadvantage that the above prior art winding methods yield exaggerated decreases in the packing fraction as the bundle extends radially outward. In order for a packing fraction to approach or exceed sixty percent throughout the bundle, the high packing fraction near a small core will encourage clotting.

SUMMARY OF THE INVENTION

In accordance with the present invention, a mass transfer device is provided having a hollow fiber bundle wound around a supporting core. The core has a first end, second end and an axis extending from said first end to said second end. The hollow fiber bundle extends radially outward relative to the axis of the core and has packing fractions which increase radially outwardly throughout a major portion of said hollow fiber bundle thereby providing a packing fraction gradient. The hollow fiber bundle further has fibers with each having a first end, a second end, a hollow interior and a semipermeable wall. The first ends of said fibers are adjacent the first end of the core and the second ends of said fibers are adjacent the second end of the core. The core further has provider means for providing a first fluid to a region of the hollow fiber bundle adjacent to the core.

The mass transfer device also has an outer housing surrounding the hollow fiber bundle. The outer housing has collector means for collecting the first fluid from a region of the hollow fiber bundle adjacent to the housing. The first fluid flows from the core radially outward through the hollow fiber bundle. The mass transfer device also has first potting means for potting the first ends of said fibers and for sealing said fibers to said core and housing and second potting means for potting the second ends of said fibers and for sealing said fibers to said core and housing. The first and second potting means, core and housing define an enclosed chamber.

A second fluid inlet is operatively connected to the interior of the fibers at one of the first ends and second ends and a second fluid outlet operatively connected to the interior of the fibers at the other of the first ends and second ends. A first fluid inlet means is operatively connected to the provider means and a first fluid outlet means operatively connected to the collector means.

In the above context, a "major" portion of the bundle means at least half as measured along the radius. In other words, for a bundle having an inside radius of 0.5 inch and an outside radius of 1.5 inches, the bundle has a radial thickness of 1.0 inch. A major portion represents at least 0.5 inch thickness. This is illustrated by the bundle between 0.5 and 1.0 radii, by the bundle between 0.75 and 1.25 radii as well as any similar pairs of radii where they differ by 0.5 inch. Alternatively, the packing fractions may also increase for at least seventy-five percent of said radial thickness of the hollow fiber bundle.

Still further, an inner average packing fraction may be defined as the average of packing fractions occurring along a radius beginning at said region of the hollow fiber bundle adjacent to the core and extending along said radius twenty-five percent outward toward the region of the hollow fiber bundle adjacent to the housing. The outer average packing fraction may be similarly defined along said radius beginning at said region of the hollow fiber bundle adjacent to the housing and extending along said radius seventy-five percent inward toward the region of the hollow fiber bundle adjacent to the core. In this case, the packing fraction associated with the bundle at the inner twenty-five percent of the radial thickness is compared to the outer seventy-five percent of the radial thickness. The inner average packing fraction as defined is less than the outer average packing fraction as defined. More specifically, the inner average packing fraction may be within the range of seventy to ninety-five percent of the outer average packing fraction as so defined.

Alternatively, the inner average packing fraction may be similarly defined along a radius beginning at said region of the hollow fiber bundle adjacent to the core and extending along said radius twenty-five percent outward toward the region of the hollow fiber bundle adjacent to the housing. The outer average packing fraction may be similarly defined along said radius beginning at said region of the hollow fiber bundle adjacent to the housing and extending along said radius twenty-five percent inward toward the region of the hollow fiber bundle adjacent to the core. Under these definitions, the inner average packing fraction may be less than the outer average packing fraction. Specifically, the inner average packing fraction may be within the range of sixty to ninety-five percent of the outer average packing fraction.

The present invention is directed to bundles where the packing fractions increase radially outward "in a major portion of the bundle". Consistent with the meaning of "throughout a major portion of the bundle" used herein, the packing fractions may increase or decrease or otherwise vary outside of such major portion. The present invention is also directed to bundles where the packing fractions "increase" radially outward in a major portion of the bundle. Consistent with the meaning of "increase" used herein, the packing fractions within the major portion are not required to be ever or exclusively increasing. Within the major portion, it is intended that such packing fractions increase radially outwardly in such major portion of the bundle in the sense that on the average such packing fractions increase even though some may decrease.

Furthermore, the packing fractions may increase, in the sense discussed immediately above, incrementally or continuously. In the case of incremental increases, the packing fraction varies incrementally but within the above description "increases radially outwardly". The incremental increases may be substantial in comparison to slight decreases between such increments. In the case of continuous increases, the packing fraction varies continuously, but within the above description of "increases radially outwardly".

The fibers may include a first plurality of fibers positioned helically around said core in a first direction from said first end to said second end of said core and a second plurality of fibers positioned helically around said core in a second direction opposite said first direction from said first end of said core to said second end of said core. The first and second plurality of fibers may intersect one another at an angle. Each of the first plurality of fibers and second plurality of fibers may be made of at least one fiber ribbon comprising one or more fibers.

Alternatively, each of said first plurality of fibers and second plurality of fibers may be made of a fiber mat comprising a plurality of substantially parallel, interconnected fibers.

The core, fiber bundle and housing may be generally cylindrical and concentrically arranged. The first fluid may be blood and the second fluid an oxygenating gas. The mass transfer device may further have a heat exchanger chamber containing heat exhanger means for regulating the temperature of blood. The heat exchanger chamber may be provided with a blood inlet and blood outlet from the heat exchanger chamber. The heat exchanger chamber blood outlet may be arranged in fluid communication with the mass transfer device first fluid inlet means.

In the method aspect of the present invention, a method for helically winding continuous semi-permeable hollow fiber on a support core is provided to produce a hollow fiber bundle for use in a radial flow mass transfer device. A winding apparatus is provided which has a rotatable mounting member having a longitudinal axis and a fiber guide adjacent said mounting member. The fiber guide is adapted for reciprocal movement along a line parallel to the longitudinal axis of said mounting member as the mounting member rotates. A support core is provided which has a first end, second end and an axis extending from said first end to said second end. The support core is mounted for rotation on said rotatable mounting member. At least one continuous length of semi-permeable hollow fiber is provided where the hollow fiber is positioned by said fiber guide and secured to said support core. The mounting member is rotated and the fiber guide is moved reciprocally with respect to the longitudinal axis of the mounting member. Fiber is wound onto said support core to form a hollow fiber bundle extending radially outward relative to the axis of the core and having packing fractions which increase radially outwardly in a major portion of said hollow fiber bundle thereby providing a packing fraction gradient.

The foregoing method may involve two or more fibers positioned by the fiber guide. The two or more fibers are wound onto the support core to form a wind angle which is in a plane parallel to the axis of the support core, tangential to the points at which the fibers are wound onto said support core and containing said fibers. The wind angle is measured between a projection into the plane of a line perpendicular to the axis of the support core and the fibers. The wind angle is increased throughout a major portion of such winding thereby providing said increasing packing fraction.

The wind angle may be increased by increasing the distance through which the fiber guide moves during one rotation of the mounting thereby providing said increasing packing fraction. The wind angle may be decreased, increased or otherwise varied outside of the major portion of the bundle. The wind angle will be considered to have increased in the major portion of the bundle if on average it increases even though it may vary including decreasing.

The winding apparatus may alternatively involve tensor means for regulating the tension of said fiber as it is wound. The tension of said fiber may be increased throughout a major portion of such winding thereby providing said increasing packing fraction. As a further alternative, the fiber guide may be adapted to regulate the spacing between two or more fibers being simultaneously wound and the spacing may be decreased throughout a major portion of such winding thereby providing said increasing packing fraction.

The major portion of said hollow fiber bundle may be further restricted to require at least seventy-five percent of said hollow fiber bundle. The inner average packing fraction, along a radius beginning at said region of the hollow fiber bundle adjacent to the core and extending along said radius twenty-five percent outward toward the region of the hollow fiber bundle adjacent to the housing may be less than the outer average packing fraction, along said radius beginning at said region of the hollow fiber bundle adjacent to the housing and extending along said radius seventy-five percent inward toward the region of the hollow fiber bundle adjacent to the core. Alternatively, the inner average packing fraction, along a radius beginning at said region of the hollow fiber bundle adjacent to the core and extending along said radius twenty-five percent outward toward the region of the hollow fiber bundle adjacent to the housing, is less than the outer average packing fraction, along said radius beginning at said region of the hollow fiber bundle adjacent to the housing and extending along said radius twenty-five percent inward toward the region of the hollow fiber bundle adjacent to the core. The inner average packing fraction is as first defined above may be in the range of seventy to ninety-five percent and as second defined above within the range of sixty to ninety-five percent of the outer average packing fraction.

As a further alternative, a method of spirally winding at least one fiber mat on a support core is provided to produce a hollow fiber bundle for use in a radial flow mass transfer device. A winding apparatus is provided having a rotatable mounting member having a longitudinal axis and a fiber mat guide adjacent said mounting member, said fiber mat guide being adapted for feeding said at least one fiber mat for winding onto a support core. A support core is provided having a first end, second end and an axis extending from said first end to said second end. The support core is mounted for rotation on said rotatable mounting member. At least one continuous length of fiber mat, said fiber mat comprising a plurality of substantially parallel, interconnected fibers, is positioned through said fiber guide and secured to said support core.

The mounting member is rotated, winding said fiber onto said support core to form a hollow fiber bundle extending radially outward relative to the axis of the core with packing fractions which increase radially outward in a major portion of said hollow fiber bundle thereby providing a packing fraction gradient. The fibers of one of said at least one mat wound onto said support core form a wind angle which is in a plane parallel to the axis of the support core and tangential to the point at which the fiber is wound onto said support core. The wind angle is measured between a projection into the plane of a line perpendicular to the axis of the support core and the fiber. The wind angle is generally increased in a major portion of such winding thereby providing said increasing packing fraction. The fibers of another of said at least one mat wound onto said support core form a wind angle which is in a plane parallel to the axis of the support core and tangential to the point at which the fiber is wound onto said support core wherein the wind angle of the fiber of one of said at least one mat. The wind angle is measured between a projection into the plane of a line perpendicular to the axis of the support core and the fiber. The wind angle of the fiber of the other of said at least one mat are in opposite directions. The wind angle of the fiber of the other of said at least one mat is generally or on the average increased throughout a major portion of such winding thereby providing said increasing packing fraction. Preferably the wind angle of each mat would be increased, but alternatively the wind angle of one of such mats could be increased.

DETAILED DESCRIPTION OF THE INVENTION

Figure 1:
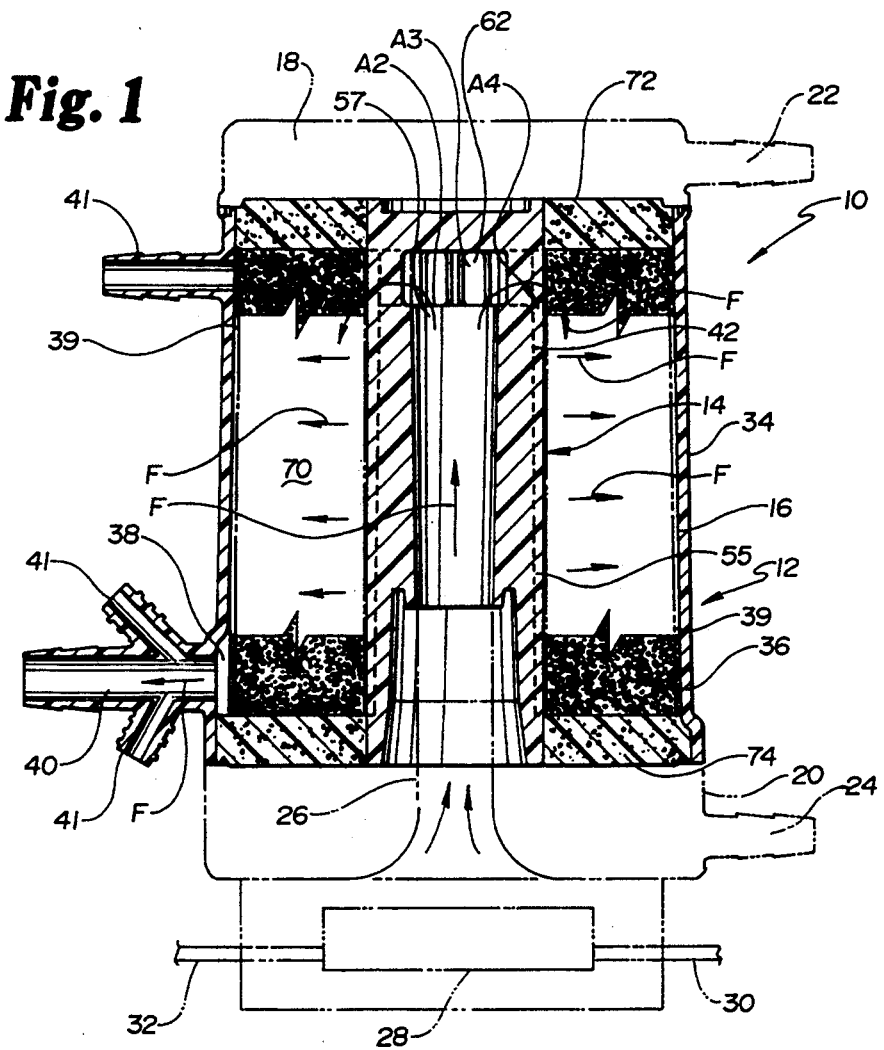
FIG. 1 is a cross-sectional view of the oxygenator of the present invention, depicting the oxygenator vertically oriented as it would be in use.

Referring to the drawings, particularly FIG. 1, the blood oxygenator 10 in accordance with the present invention comprises a cylindrical outer housing 12, a generally cylindrical inner support core 14. A gas header or cap 18, including a gas inlet 22, is fitted at the top of the oxygenator 10. Similarly, a bottom header or cap 20, including a gas outlet 24, is fitted to the bottom of the oxygenator 10. The bottom header also includes a blood entrance for providing a blood flow into the oxygenator 10.

The oxygenator 10, at the bottom header 20, also may be provided with, or carry a suitable heat exchanger 28. A fluid type heat exchanger 28 is depicted with an inlet 30 and an outlet 32, but other suitable heat exchange devices might be incorporated with the oxygenator 10, for example, an electrical heating and cooling device might be used.

The outer casing 12 has a generally cylindrical outermost peripheral wall 34, open at both ends prior to assembly of the oxygenator 10. At the base region 36, the inside of the wall 34 of the outer housing 12 includes an annular eccentric relieved area 38 in an outlet manifold 39 adjacent to the wall 34. A blood outlet 40 is at the bottom of the manifold 39. Other outlets or ports, such as sampling or recirculation ports 41, may be suitably located on the oxygenator 10.

Figure 2:
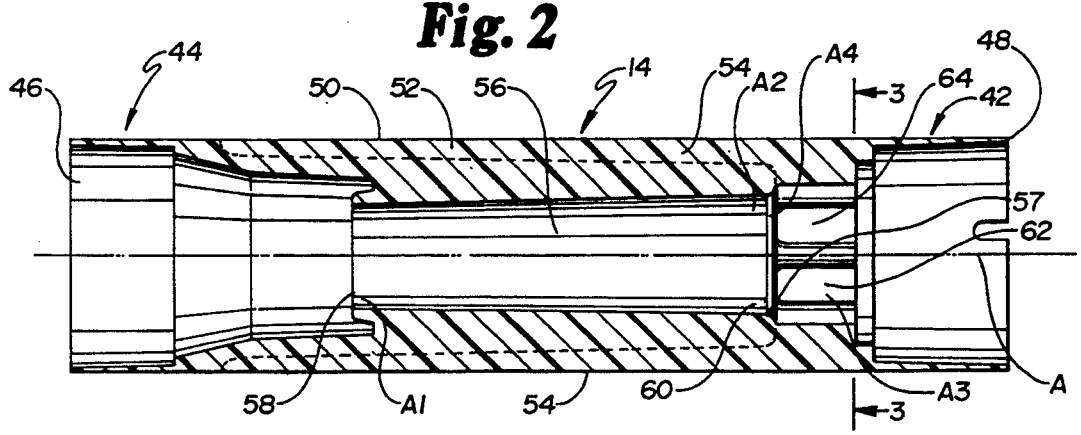
FIG. 2 is a longitudinal cross-sectional view of the core mandrel for use in the oxygenator of the present invention.
Figure 3:
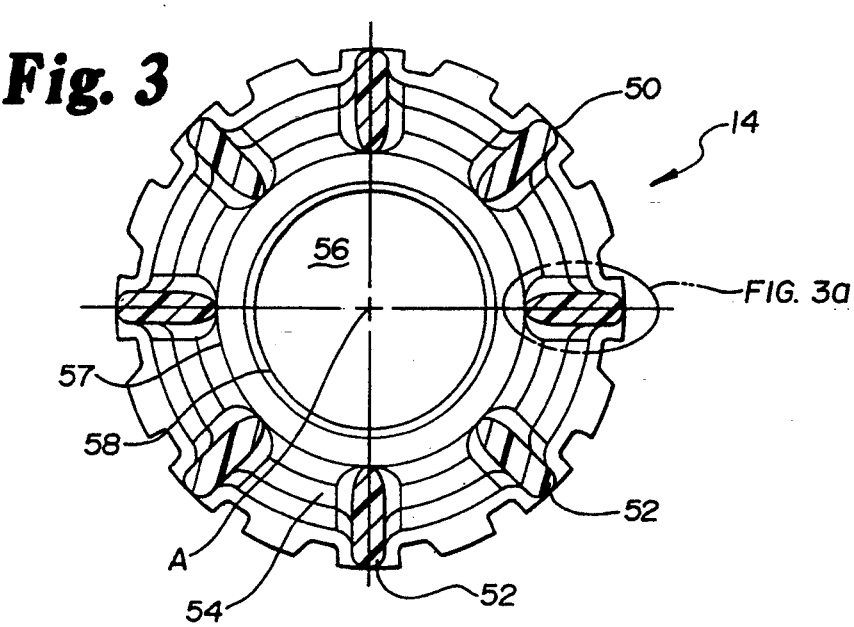
FIG. 3 is a cross-sectional view of the core mandrel taken along line 3—3 of FIG. 2.
Figure 3A:
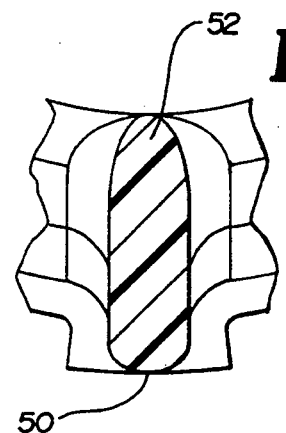
FIG. 3a is a fragmentary detail of one of the ribs of the core of the present invention taken from the encircled area in FIG. 3.

Referring to FIG. 2, the inner support core 19 is generally cylindrical with a first top end 42, a second bottom end 44 and a longitudinal axis A extending between the ends. At each end 42, 44, the core 14 carries disposable support flanges 46, 48, respectively. Referring to FIG. 3a, the outer diameter of the core 14 is defined by the outermost surface 50 of each of a plurality of ribs 52. The ribs 52 are generally parallel to the core axis A and to each other, and extend for the length of the core 14 between the disposable support flanges 46, 48. Between each rib 52, the core 14 has a plurality of relieved or recessed inlet manifold regions 54. Two such regions 54 are apparent in FIG. 2. These regions and others not shown in FIG. 2 are disposed between the ribs 52 equally about the entire outer circumference of the core. The core includes a lumen 56 defined by the thickened generally central portion of the core. One end of the lumen comprises a blood inlet 58 and is designed to be mounted on the blood fitting 26 of the bottom cap 20. The other end of the lumen is an open end 60 and is in fluid connection with a chamber 62 defined by the ribs extending past the chamber to the end of the core. The chamber 62 has one or more window openings 64 between the ribs 52. The openings 64 are disposed between the ribs about the entire circumference of the core and are in fluid communication with the recessed or relieved inlet manifold regions of the core. The outside surface of the core 14 between the ribs tapers outwardly from the top end 42 adjacent the window 64 to the bottom end and above the core 14 in which the blood inlet 58 is located. Conversely, the lumen 56 tapers inwardly from the top end 48 of the core 14 adjacent the window 64 to a narrowest diameter adjacent the blood inlet 58.

The following calculations reflect relative cross-sectional areas of core 14 including the cross-sectional areas available for blood flow through core portions. The reference points ($A_1$, $A_2$, $A_3$, $A_4$) are depicted in FIGS. 1 and 2 and indicate the cross-sections at the top of the lumen 56, through the windows 64 and at the top of the inlet manifold, formed by the relieved regions 54, respectively. $A_1$ is the area at the blood inlet 58.

$A_1 = 0.249$ square inches, $A_2 = 0.346$ square inches, $A_3 = 0.331$ square inches and $A_4 = 0.504$ square inches.

$$\frac{A_3}{A_2}$$

Should be between 0.5 and 1.5, with a preferred value of 0.957

$$\frac{A_4}{A_3}$$

Should lie between 0.7 and 1.7, with a preferred value of 1.522

Referring back to FIG. 1, an annular bundle 70 of helically wound, microporous hollow fibers is positioned in a space defined by the outermost extent of the ribs 52 on the support core 14 and the wall 34 of the outer housing 12. The outlet manifold is formed by the gap between the radially outermost region or surface of the bundle and the wall of the housing. The top and bottom ends of the bundle 70 are embedded in a solidified potting composition at the top and bottom ends of the oxygenator. The fiber lumens communicate with the outer surface of the upper and lower potted portions 72, 74, respectively. An oxygenating gas introduced via gas inlet 22 flows into the top cap 18, through the lumens of the hollow fibers, down to the opposite ends of the hollow fibers at the lower potted region 74, and into the gas outlet passage 24.

In operation, the oxygenator 10 is in a general vertical position such as that depicted in FIG. 1. Blood to be oxygenated is introduced into the core 14 through the entrance 26 of the bottom cap 20 and through the blood inlet end 58 of the core 14. The blood flows upwardly into the lumen 56 of the core 14 toward the circumferential rib and window array at the uppermost end of the core 14. The blood flows through the windows 64, over the rounded lip 57 of the lumen 56 and into the plurality of recesses or relieved regions filling the inlet manifold provided by the space between the innermost region of the fiber bundle and the outside surface of the lumen 56 of the core 14. From the inlet manifold, the blood flows radially away from the core 14, all along the length of the core 14 between the upper and lower potted regions 72, 74, or in other words, the length of the ribs 52 and relieved areas therebetween. The blood flows through the bundle radially over the outside of the fibers and enters the outlet manifold 39 evenly along the length from the top to the bottom thereof. The blood collects in the outlet manifold, particularly in the eccentric collection region 74 adjacent the base of the oxygenator 10, and exits the oxygenator 10 through the blood outlet 75.

Gas enters the oxygenator unit 10 through the gas inlet 22 and flows from inside of the cap 18 into and through the hollow fibers comprising the bundle 70, into the chamber defined by the bottom cap 20 and out the gas outlet 24. Gas exchange takes place via diffusion through micropores in the hollow fibers as the radial blood flow and the gas flow generally perpendicular to the blood flow is occurring.

It should be understood that the potting process referred to hereinabove is a well known fiber potting process wherein the preferred potting material is polyurethane introduced by centrifuging and reacted in situ. Other appropriate potting materials may be used. Suitable sealants and gaskets may be used at joints in the present invention, such as the joints between the top and bottom caps 18, 20 and the outer housing 12. The outer housing 12, the various inlet and outlet nozzles 40, 41, etc., and the top and bottom caps 18, 20 may be formed from suitable polycarbonate, one example being the polycarbonate MAKROLON TM, from Miles, Inc., Elkart, Indiana. Similarly, any suitable microporous fiber may be used in the mass transfer device of the present invention depending upon the particular application. In the case of the preferred embodiment, a blood oxygenator, a suitable fiber is the microporous polypropylene fiber denoted X-10 made by Hoechst-Celanese.

In an incrementally increasing wind angle, the wind angle is adjusted a finite number of times during the winding. Between such adjustments, the procedure for spirally winding semi-permeable hollow fiber on a supporting core is set forth in U.S. Pat. No. 4,975,247 at column 9, line 36 through column 11, line 63, including FIGS. 12 through 16A, all of which are incorporated herein by reference thereto for showing the following winding procedure now generally described.

Figure 4:
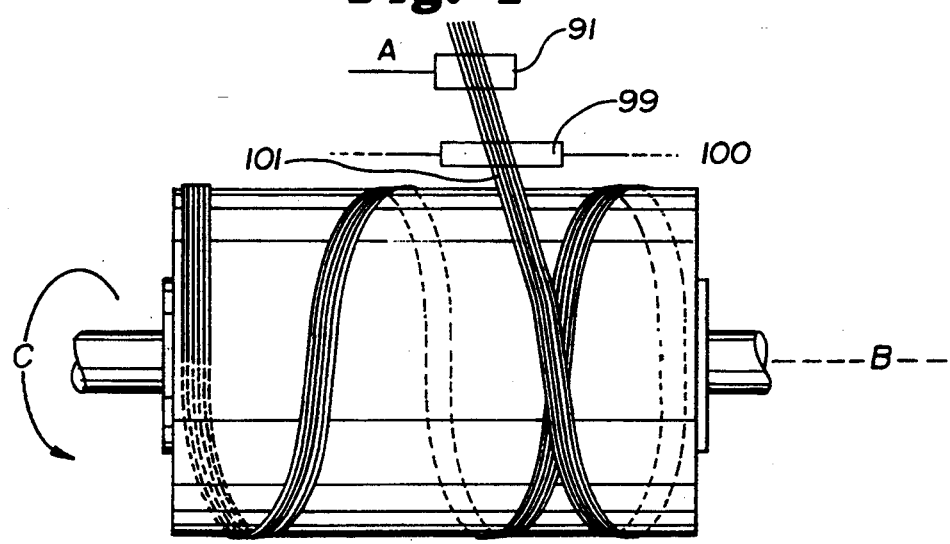
FIG. 4 is a schematic view of the support core showing the hollow fiber ribbon being wound on the core in an early stage of the winding process.

The hollow fiber winding process may be conveniently performed on an apparatus of the type illustrated schematically in FIG. 4. The fiber winding apparatus comprises a rotating mounting member and a fiber guide 91 which travels reciprocally as illustrated by double-headed arrow A in FIG. 4 with respect to the longitudinal axis B, i.e. along line A which is parallel to the axis of rotation B of the mounting member. The fiber guide contains a number of tubes, not illustrated in FIG. 4, through which the fibers are threaded as they enter the guide from a supply container. Alternatively, upstanding ribs, groves or guide pins may be used to space the fibers. Also, ribbons may be formed having any number of fiber strands. The industry commonly uses 6 strands and other numbers. Commerically available winding apparatus are available for wrapping a continuous hollow fiber (or a number of such hollow fibers) on the support core. (Entec, Salt Lake City, Utah offers a winding apparatus with electronic gearing for varying the rotational speed of the mounting member and the traverse speed during winding).

The core just described is spirally wound with hollow fibers in the following manner. The inner support core is mounted on mounting member 90 of the winding apparatus. Guide 91 is then positioned at the left hand side (as viewed in FIG. 4) of the extended core. A ribbon of six continuous semi-permeable hollow fiber is constructed from spools of single-stranded fiber in known ways and threaded through the guide tubes of fiber guide 91. Six such guide tubes are used, one continuous hollow fiber being placed through each tube in order to separate the fibers as they leave the supply container. The leading end of the fiber ribbon is affixed to the outer surface of the core extended at the far left end of the core. Rotation of mounting member 90 of the winding apparatus is begun in the direction indicated by arrow C in FIG. 4. Motion of guide 91 is synchronized, preferably by gearing, to mounting member 90 and automatically travels axially of the core as mounting member 90 rotates. It will be recognized by those skilled in the art that guide 91 travels axially a fixed distance for each revolution of mounting member 90.

Guide 91 travels from the first end (left hand side of FIG. 4) of the core to the second end (right hand side of FIG. 4) where it decelerates. After decelerating, the guide reverses direction, accelerates and travels back to its starting position. After decelerating again and reversing direction, the guide begins its travel cycle anew. Alternatively, the guide may stop and dwell at the end points of the traverse. The preferred reciprocal travel for guide 91 and the concurrent rotation of mounting member 90 on which the extended support core has been mounted is continued, subject to the following described alteration, until a fiber bundle of desired diameter has been wound onto the extended core.

As described more fully at column 10, line 23 through column 11, line 62 of the '247 patent, in the left-to-right travel of guide 91, the fiber ribbon was wound spirally around the extended support core and the individual fibers in the ribbon were laid down in contact with the outer surfaces of the support core. In the subsequent second traverse (right-to-left in FIG. 4) of guide 91, fiber ribbon continues to be spirally wound onto the extended core. Portions of the six fibers laid down during the second traverse of the fiber guide contact fibers at certain crossover points. Except for these crossover points at which there is fiber-to-fiber contact with fibers laid down during the first traverse of guide 91, the fibers laid down during the second traverse of the fiber guide come into direct contact with the outer surface of the extended core. In the known winding procedure being discussed, the core is covered, except for the spacing, s, between adjacent fibers and the distance, x, between the sixth fiber of one ribbon and the first fiber of the next adjacent ribbon, when the fiber guide has traveled a sufficient number of traverses. Fibers of the fiber ribbon laid down at a later traverse of the fiber guide will be in radial registry with fibers laid down during an earlier traverse of the fiber guide as taught in the art including the '247 patent at column 11, line 13 through line 45.

Figure 7:
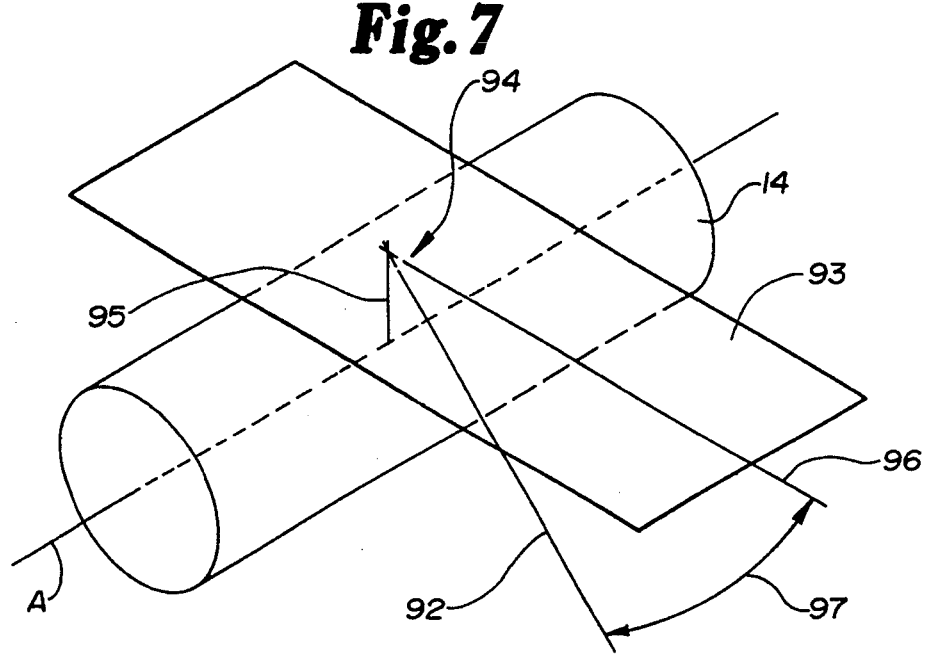
FIG. 7 is a schematic representation of the winding apparatus for the winding method of the present invention wherein a fiber or ribbon of fibers is wound on the core showing the wind angle.

FIG. 7 illustrates the wind angle for a single fiber, but would apply as well for each of two or more fibers. Fiber 92 is contained in plane 93. Plane 93 is parallel to the axis A of core 14. Plane 93 is tangential to point 94 at which fiber 92 is wound onto core 14. Line 95 is perpendicular to axis A and passes through point 94 and axis A. Line 96 is a projection into plane 93 of the normal line 95. Wind angle 97 is measured in plane 93 between projection line 96 and fiber 92.

Alternatively, line 92 in tangential plane 93 is a projection into plane 93 from a fiber (not shown) which lies outside of plane 93.

EXAMPLE

Figure 5:
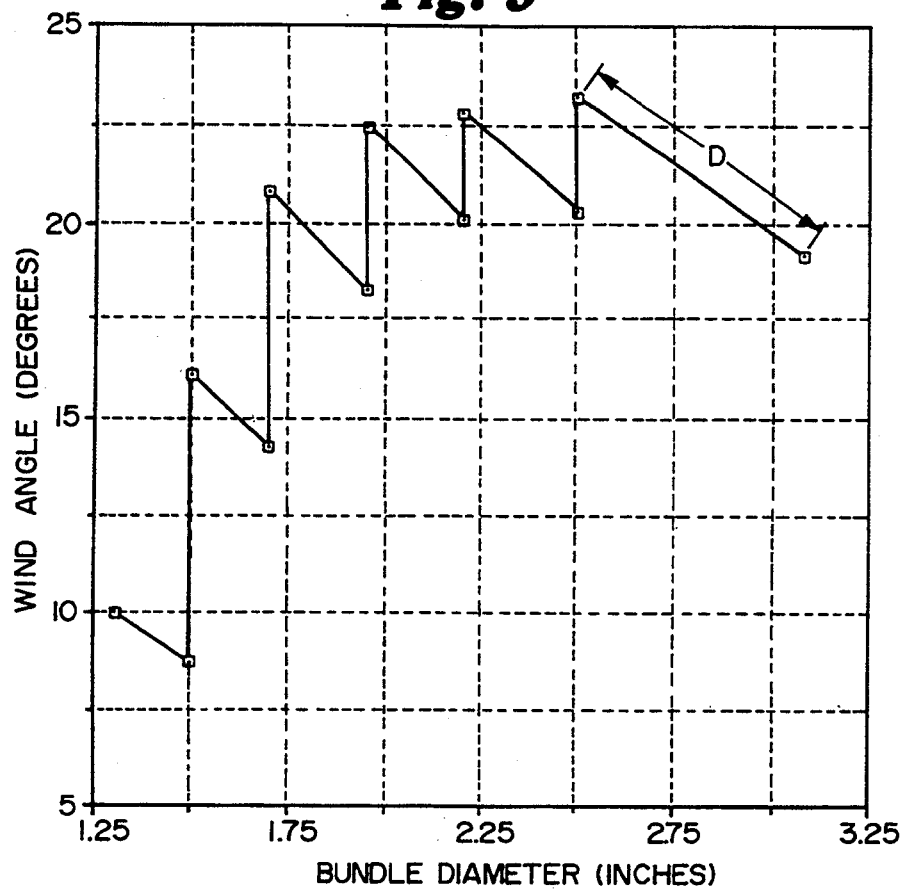
FIG. 5 is a graph depicting fiber wind angle as a function of bundle diameter.
Figure 6:
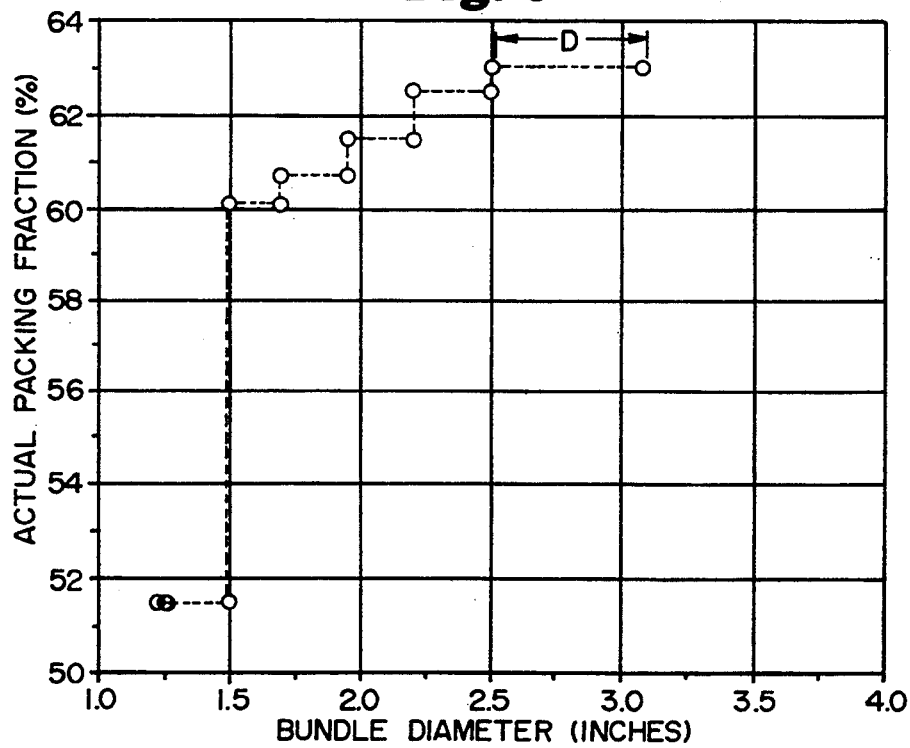
FIG. 6 is a graph depicting actual packing fraction verses bundle diameter.

In the preferred embodiment, the ratio of the mandrel or core rotation relating to the traverse motion of the guide was adjusted incrementally five times thereby adjusting the wind angle of the fiber ribbon five times. This is illustrated in FIG. 5 for a 1.30 inch core. FIG. 6 shows the actual packing fraction resulting from such incremental adjustments as measured by the procedures set forth above. For example, the fifth adjustment designated D in FIGS. 5 and 6, shows the average packing fraction for the region or zone defined by a radius extending from the axis of the core in the range of 2.5 inches to about 3.1 inches, that results from setting the wind angle at about 23° at the radius of 2.5 inches and winding according to the conventional method discussed above through to a radius of about 3.1 inches.

In an oxygenator, without attached optional heat exchanger, having a membrane area of about 2.50 m$^2$ and prime volume of 200 ml, the following results were obtained for blood and ventilating gas flow rates of 7 lpm.

| | |
|---|---|
| $O_2$ transfer rate | 430 ml/min |
| $CO_2$ transfer rate | 350 ml/min |
| Blood path $\Delta P$ | 60 mm Hg |
| Gas path $\Delta P$ | 7 mm Hg |

As alternatives to the above method of the Example, in which the wind angle was incrementally increased thereby providing an increasing (as defined above) packing fraction, the winding apparatus may include means for regulating the tension of the fiber as it is wound. The tension of the fiber if increased during winding will cause the fiber to pack increasingly thereby increasing the packing fraction in a radially outward direction. FIG. 4 shows roller 99 which rotates on axis 100. Roller 99 may rotate in response to fiber ribbon 101 passing against it or may be driven so that its rotation matches the speed of ribbon 101. Here, as for all alternatives that follow, the use of fiber tension to regulate the packing fraction may be used with or in place of other methods for regulating packing fraction such as regulating the wind angle.

Figure 9:
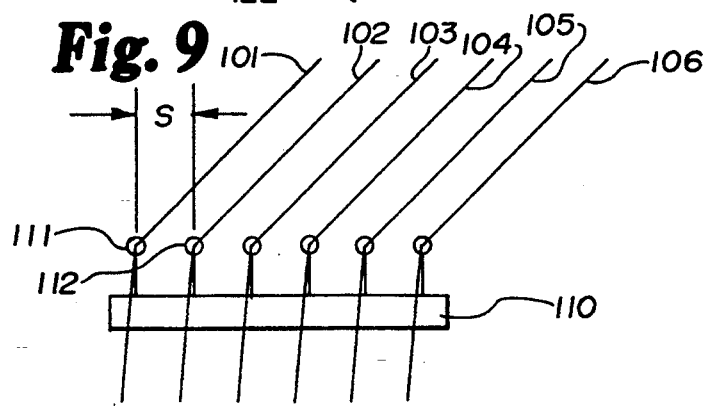
FIG. 9 is a schematic representation showing a fiber guide adapted for variable spacing between fibers.

As a further alternative, the spacing between two or more fibers being simultaneously wound may be decreased during winding, either incrementally or continuously, to increase packing fractions in a radially outward direction. FIG. 9 shows a five fiber stranded ribbon made of fibers 101, 102, 103, 104, 105 and 106 by guide 110 having eyelets for fiber to pass through. The spacing "s" between eyelets 111 and 112, for example, may decrease during winding, incrementally or continuously, to increase packing fractions.

As a still further alternative, a fiber mat, comprising one or more plies, of may be used to make a bundle according to the invention. U.S. Pat. No. 4,940,617 shows a two ply mat having parallel fibers interconnected by cross-stitching where the fibers in one ply form an angle relative to the fibers in an adjacent layer. The '617 patent also shows the construction of bundles by winding such mats onto a core. Column 3, line 26 through column 14, line 67, including the figures referenced therein, contain the disclosure of such mats and bundles and are incorporated herein by reference.

Figure 8:
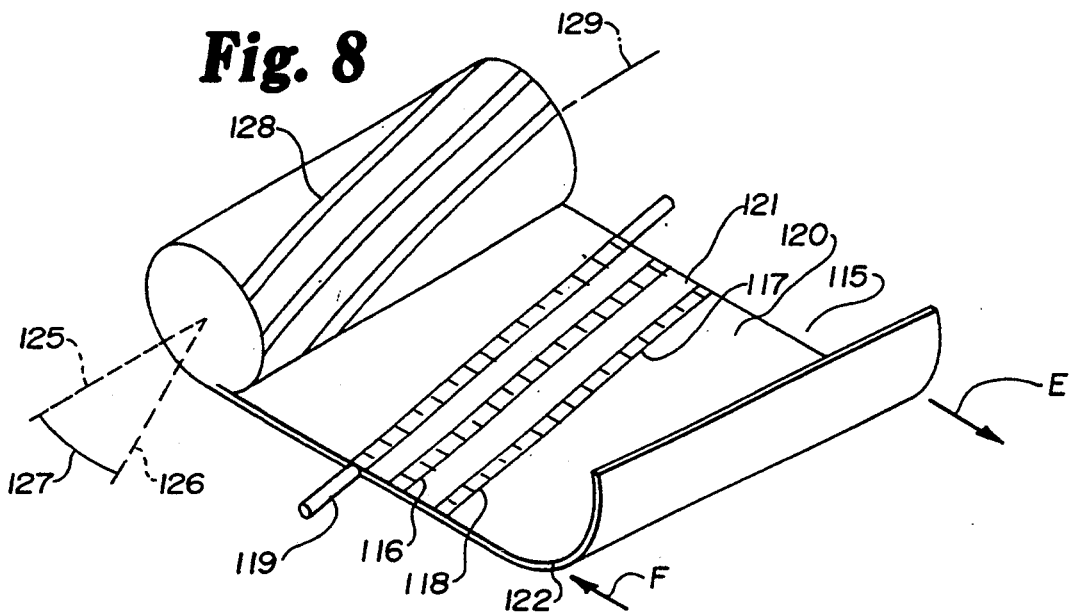
FIG. 8 is a schematic representation of an alternative winding method for forming a fiber bundle comprising layers of fiber mats.

FIG. 8 shows schematically a two ply mat 115 containing fibers illustrated by fiber 116 and 117 interconnected by cross-stitching illustrated by cross-stitch 118. A radially outwardly increasing packing fraction may be obtained by applying tension to mat 115 by roller 119 similar to the above discussion for FIG. 4 and roller 99. A radially outwardly increasing packing fraction may be obtained by applying shear stress to one or more of the plies, illustrated by stretching ply 120 at side 121 in the direction E and side 122 in direction F. Other means may be employed for increasing the angle of the fiber. Angle 127 is defined by lines 125 and 126. As shown, line 125 is contained in the ply containing fiber 128 and is parallel to axis 129, while line 126 is an extension of fiber 126 at side 122.

We claim:

1. A mass transfer device comprising
a hollow fiber bundle wound around a supporting core, said core having a first end, second end and an axis extending from said first end to said second end, said hollow fiber bundle extending radially outward relative to the axis of the core and having packing fractions which increase radially outwardly in a major portion of said hollow fiber bundle thereby providing a packing fraction gradient, said hollow fiber bundle further comprising fibers each having a first end, a second end, a hollow interior and a semi-permeable wall wherein the first ends of said fibers are adjacent the first end of said core and the second ends of said fibers are adjacent the second end of said core, said core further having provider means for providing a first fluid to a region of the hollow fiber bundle adjacent to the core;
an outer housing surrounding said hollow fiber bundle, said outer housing having collector means for collecting the first fluid from a region of the hollow fiber bundle adjacent to the housing, said first fluid flowing from the core radially outward through the hollow fiber bundle;
first potting means for potting the first ends of said fibers and for sealing said fibers to said core and housing;
second potting means for potting the second ends of said fibers and for sealing said fibers to said core and housing, wherein said first and second potting means, core and housing define an enclosed chamber;
a second fluid inlet operatively connected to the interior of said fibers at one of said first ends and second ends and a second fluid outlet operatively connected to the interior of said fibers at the other of said first ends and second ends; and
a first fluid inlet means operatively connected to the provider means and a first fluid outlet means operatively connected to the collector means.

2. A mass transfer device according to claim 1 wherein said major portion of said hollow fiber bundle is at least seventy-five percent of said hollow fiber bundle.

3. A mass transfer device according to claim 1 wherein an inner average packing fraction, along a radius beginning at said region of the hollow fiber bundle adjacent to the core and extending along said radius twenty-five percent outward toward the region of the hollow fiber bundle adjacent to the housing, is less than the outer average packing fraction, along said radius beginning at said region of the hollow fiber bundle adjacent to the housing and extending along said radius seventy-five percent inward toward the region of the hollow fiber bundle adjacent to the core.

4. A mass transfer device according to claim 3 wherein the inner average packing fraction is within the range of seventy to ninety-five percent of the outer average packing fraction.

5. A mass transfer device according to claim 1 wherein the inner average packing fraction, along a radius beginning at said region of the hollow fiber bundle adjacent to the core and extending along said radius twenty-five percent outward toward the region of the hollow fiber bundle adjacent to the housing, is less than the outer average packing fraction, along said radius beginning at said region of the hollow fiber bundle adjacent to the housing and extending along said radius twenty-five percent inward toward the region of the hollow fiber bundle adjacent to the core.

6. A mass transfer device according to claim 5 wherein the inner average packing fraction is within the range of sixty to ninety-five percent of the outer average packing fraction.

7. A mass transfer device according to claim 1 wherein said packing fractions increase incrementally.

8. A mass transfer device according to claim 1 wherein said packing fractions increase continuously.

9. A mass transfer device according to claim 1 wherein said fibers include a first plurality of fibers positioned helically around said core in a first direction from said first end to said second end of said core and a second plurality of fibers positioned helically around said core in a second direction opposite said first direction from said first end of said core to said second end of said core, wherein said first and second plurality of fibers intersect one another at an angle measured along the axis of said core.

10. A mass transfer device according to claim 9 wherein each of said first plurality of fibers and second plurality of fibers comprises at least one fiber ribbon comprising one or more of said fibers.

11. A mass transfer device according to claim 9 wherein each of said first plurality of fibers and second plurality of fibers comprises a fiber mat comprising a plurality of substantially parallel, interconnected fibers.

12. A mass transfer device according to claim 1 wherein said fibers are arranged in a fiber mat comprising a plurality of substantially parallel, interconnected fibers.

13. A mass transfer device according to claim 1 wherein said core, fiber bundle and housing are generally cylindrical and concentrically arranged.

14. A mass transfer device according to claim 1 wherein the first fluid is blood and the second fluid is an oxygenating gas.

15. A mass transfer device according to claim 14 wherein said mass transfer device further comprises a heat exchanger chamber containing a heat exchanger means for regulating the temperature of blood, said heat exchanger chamber provided with a blood inlet and blood outlet from said heat exchanger chamber, wherein said heat exchanger chamber blood outlet is arranged in fluid communication with the mass transfer device first fluid inlet means.

* * * * *